May 23, 1933.  H. PFANNENSTIEHL  1,910,179
SOUND PICTURE PROJECTOR
Filed May 31, 1930
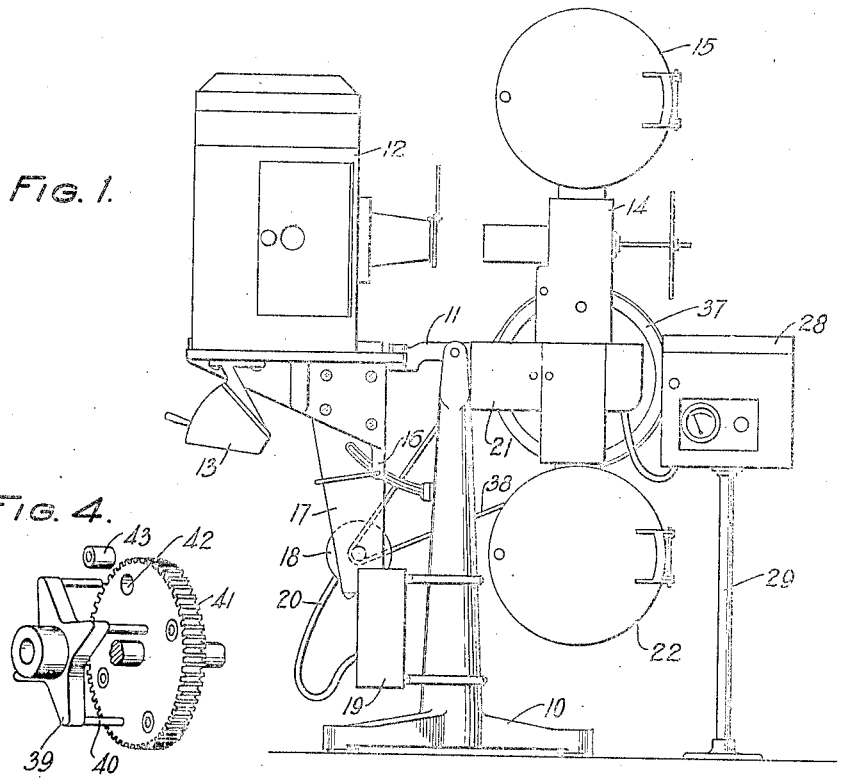
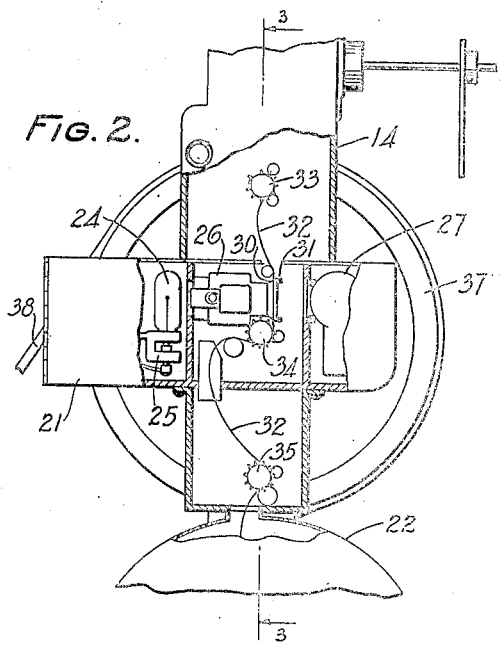
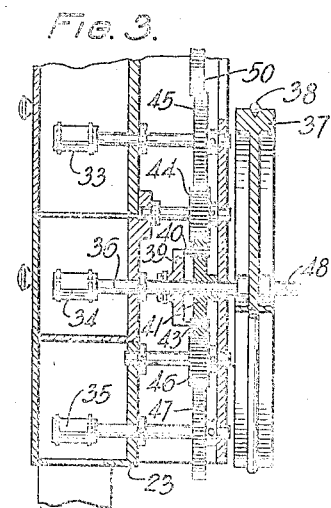
INVENTOR
H. PFANNENSTIEHL
BY
G. H. Heydt
ATTORNEY Patented May 23, 1933

1,910,179

UNITED STATES PATENT OFFICE

HARRY PFANNENSTIEHL, OF MOUNTAIN LAKES, NEW JERSEY, ASSIGNOR TO BELL TELEPHONE LABORATORIES, INCORPORATED, OF NEW YORK, N. Y., A CORPORATION OF NEW YORK

SOUND PICTURE PROJECTOR

Application filed May 31, 1930. Serial No. 458,459.

This invention relates to motion picture projectors and has for its object the provision of an attachment to a motion picture projector to adapt the projector for the reproduction of sound in addition to the projection of motion pictures.

A feature of this invention is a drive mechanism by which a motion picture projector and a film sound reproducing unit may be operated from a common source of power. Another feature of this invention is a drive mechanism adapted to move a sound record at constant speed past the point of reproduction of the sound.

A further feature of this invention is a resilient coupling means incorporated in the mechanism driving the motion picture projector whereby the pulsations in the drive of the motion picture projector due to the operation of the intermittent mechanism are prevented from affecting the constancy of motion of the sound record at the point of reproduction of the sound.

The combination of a motion picture film having a series of pictures depicting an action and a synchronized record of the sounds accompanying the action is well known. The sound record may have the form of a photographic record of the sound placed on the same film as carries the series of pictures or the sound record may be a mechanical, chemical, magnetic or other record placed on a medium separate from the medium carrying the picture. For convenience of description the present invention has been generally described as applied to a film carrying both pictures and sound on one medium but it will be apparent that the invention is not limited to this specific type of sound record.

In accordance with this invention a motion picture film is drawn from the feed reel and passed through a motion picture projector of conventional design in which the film is intermittently projected to the screen. The film may then pass into an attachment constructed in accordance with this invention and be drawn at constant speed past the point of reproduction of the sound. The film is then passed over a hold-back sprocket and reeled up on a take-up reel.

To insure the necessary constancy of speed at the point of reproduction of the sound the film is drawn past this point by a constant speed drive such as a suitable sprocket secured to a shaft journalled in bearings mounted in the casing of the attachment. Permanently attached to this shaft is a heavy flywheel circumferentially grooved to retain a belt. Power from a constant speed motor is supplied through the belt to the flywheel. The belt is preferably woven of some textile material so as to have considerable flexibility and to damp out vibrations which tend to be transmitted from the source of power along the belt to the flywheel. A rigid spider is secured to the aforesaid shaft and drives a gear wheel rotatably mounted on the shaft by means of projections on the arms of the spider which register with corresponding holes in the web of the gear wheel. Resilient sleeves which surround the projections on the spider and are retained in the holes in the web of the gear assist in damping out vibrations which tend to be transmitted from the gear to the shaft and which would affect the constancy of rotation of the shaft. The rotatably mounted gear wheel is connected through suitable gearing to drive the intermittent mechanism of the motion picture projector and the hold-back sprocket which feeds the film to the take-up reel. A connection may be provided on the outer end of the constant speed shaft to drive sound records registered on separate mediums synchronously with the movement of the film.

In the drawing,

Fig. 1 is a side elevation of a motion picture projector adapted for the reproduction of sound incorporating the features of the invention;

Fig. 2 is a side elevation in part section of the sound reproducing attachment;

Fig. 3 is a sectional elevation along line 3—3 of Fig. 2; and

Fig. 4 is a detail view of the drive gear and resilient coupling.

Pivoted on a pedestal 10 is a bracket 11 supporting a lamphouse 12 containing a suitable projection light controlled by the switch 13. Supported on the other end of the bracket 11 is a motion picture projector head 14 supporting a feed reel 15. Light from the lamphouse 12 is directed through the film in the projector head 14 to a motion picture screen. The bracket 11 may be tilted with respect to the pedestal 10 to direct the projected light to the screen and may be clamped in the desired position by the clamp 16. A conventional type of motion picture projector has been indicated by way of illustration only and it will be apparent that the invention is not restricted to the particular type of projector shown but is applicable to many well-known types of motion picture projectors.

Mounted on a bracket 17 affixed to the bracket 11 is a source of power 18 which for convenience of description has been illustrated as a constant speed electric motor supplied with electric power from the control box 19 through a cable 20.

Removably supported by the bracket 11 is a casing 21 containing apparatus adapted for the reproduction of sound from a photographic sound record and cooperating with the mechanism of the projector head 14 to transfer the motion picture film from the feed reel 15 to the take-up reel 22 attached to the case 21.

The casing 21 comprising the attachment of the invention is divided by a vertical longitudinal wall 23 (better shown in Fig. 3) into a front and a rear compartment. The front compartment as shown in Fig. 2 is further sub-divided into four smaller compartments. A suitable source of illumination 24 which may be an electric lamp supplied from any convenient source is supported in one compartment by a bracket 25 secured to the wall of the casing. The light from the source 24 is focussed by an optical system 26 in the center compartment onto the film sound record 32. The light modulated by the film sound record 32 excites a photoelectric cell 27 producing in the output of the cell an electric current modulated in accordance with the sound record. The modulated output of the photoelectric cell may be amplified in a suitable thermionic amplifier 28 and may then pass through further amplifiers and control devices (not shown) to a sound radiator. To reduce the length of the connections between the photoelectric cell 27 and the input of the amplifier 28 the amplifier 28 may be mounted on an adjustable pedestal 29. The film sound record is supported in the focus of the optical system 26 and guided at the point of reproduction of the sound by the cooperation of an aperture plate 30 and a spring presser foot 31 of a type well known in the art.

To avoid changes in the pitch of the reproduced sound the sound record must pass the point of reproduction of the sound at a constant and uniform speed. In the motion picture projector head, however, the film is usually given an intermittent motion. To prevent the irregularities in the motion of the film in the projector head from being communicated to the sound record at the point of reproduction of the sound the sound record 32 is moved forward by a constantly rotating sprocket 33 and a small loop is formed in the film 32 between the sprocket 33 and the aperture plate 30. The sound record 32 is drawn through the aperture plate 30 and presser foot 31 by a sprocket 34 which must have a very constant speed of rotation. The sound record 32 is then driven forward by a constantly rotating sprocket 35 and reeled up on the take-up reel 22.

To insure very constant speed of rotation the sprocket 34 is secured to a shaft 36 adapted to rotate in suitable bearings journalled in the walls of the casing. A heavy flywheel 37 is secured to the outer end of the shaft 36 and is circumferentially grooved on the periphery to retain a driving belt 38. Power is transmitted from the motor 18 through the belt 38 to rotate the flywheel 37. It has been found that if the belt 38 is of soft flexible material such as a loosely woven textile material, that the cooperation of the flexible belt and the heavy flywheel produces a very constant rotation of the shaft 36.

A spider 39 is secured to the shaft 36 by any convenient means such as a set screw, key or pin. The outer extremities of the arms of the spider 39 are shaped to form projections 40 extending parallel to the shaft 36. A gear wheel 41 is rotatably mounted on the shaft 36. A series of holes 42 registering with the projections 40 on the spider 39 are drilled or otherwise formed in the web of the gear 41. The holes 42 are of considerably greater diameter than the projections 40. Sleeves 43 of a resilient material such as rubber fit snugly into the holes 42 and are centrally pierced to fit snugly over the projections 40. Power from the shaft 36 will be transmitted through the spider 39 to rotate the gear 41 but any vibrations transmitted to the gear 41 will be largely absorbed by the resilient sleeves 43 and thus prevented from affecting the constancy of rotation of the shaft 36. The gear 41 meshes with and drives an idler gear 44 which drives gear 45 causing the sprocket 33 to rotate at constant speed. Meshing with the gear 45 are such other gears as indicated by gear 50 as are necessary to drive the particular motion picture projector head which it is desired to use.

The gear 41 also meshes with and drives a second idler gear 46 which drives the gear 47 causing the hold-back sprocket 35 to rotate at constant speed. While idler gears 44 and 46 have been described it is apparent that these gears may be omitted or any other combination of gears used depending on the direction of rotation desired for the sprockets 33 and 35 and the specific mechanism used in the motion picture projector head. The outer end of the shaft 36 may be extended through the flywheel 37 as shown at 48 to form a connection for a flexible shaft (not shown) which may be used for driving any other type of sound reproducing equipment desired such as a conventional phonograph.

What is claimed is:

1. In a sound picture projector in combination a film bearing a series of pictures and a record of sound, a projection light, intermittently operating mechanism for controlling the projection of said pictures by said light, means for reproducing sound from said record, a shaft, means mounted on said shaft for causing said record to move past said reproducing means, a flywheel mounted on said shaft, a source of power, resilient means for driving said flywheel from said source of power, a hold-back sprocket, a gear wheel rotatably mounted on said shaft and driving said intermittently operating mechanism and said hold-back sprocket, a spider on said shaft having projections registering with holes pierced in the web of said gear wheel and resilient means interposed between said projections and the web of said gear wheel.

2. In a sound picture projector, in combination, a supporting base, a sound unit mounted thereon, a picture projector head mounted upon said sound unit, means in said projector head actuated by a projector drive gear to advance a film through said head, means in said sound unit for advancing said film including a constant speed sprocket mounted on a constant speed shaft journalled in said unit and a hold-back sprocket mounted on a hold-back shaft journalled in said unit and having a hold-back gear affixed thereto, a flywheel mounted on said constant speed shaft, resilient means for driving said flywheel, a gear rotatably mounted on said constant speed shaft and driving said projector drive gear and said hold-back gear, a spider affixed to said constant-speed shaft and having projections registering with holes pierced in the web of said rotatably mounted gear, and resilient means interposed between said projections and the web of said gear.

In witness whereof, I hereunto subscribe my name this 29 day of May, 1930.

HARRY PFANNENSTIEHL.